(No Model.)
L. HOUZE.
FLOAT FOR GLASS FURNACES.
No. 455,486. Patented July 7, 1891.
Fig. 1.
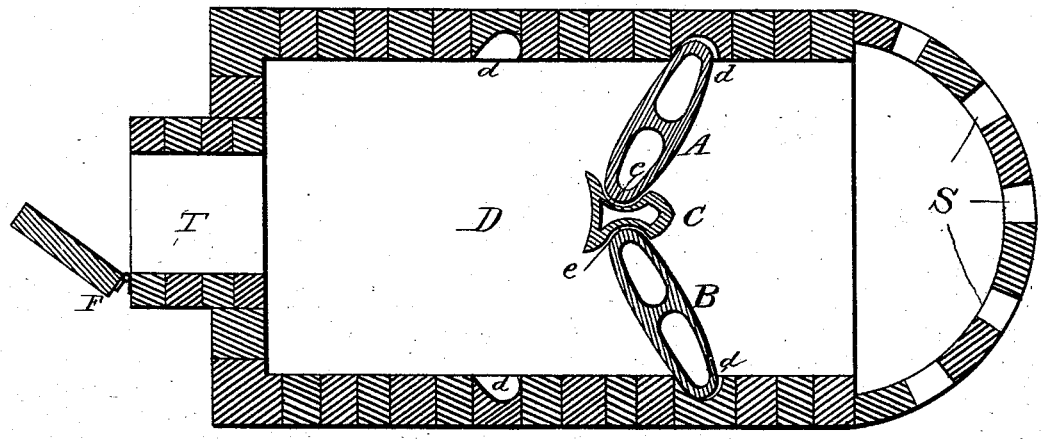
Fig. 2.    Fig. 3.    Fig. 4.
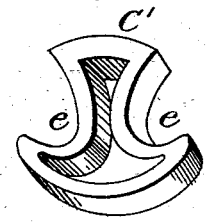 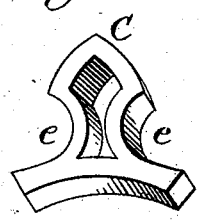 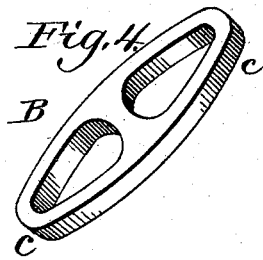
Witnesses
Corinne E. Barnd.
Victor H. Barnd
Inventor
Luke Houze
By Charles J. Barnd
his Attorney

UNITED STATES PATENT OFFICE.

LUKE HOUZE, OF FOSTORIA, OHIO, ASSIGNOR OF TWO-THIRDS TO CHARLES FOSTER, LEOPOLD MAMBOURGH, AND JOHN E. WILKESON, ALL OF SAME PLACE.

FLOAT FOR GLASS-FURNACES.

SPECIFICATION forming part of Letters Patent No. 455,486, dated July 7, 1891.

Application filed June 2, 1890. Serial No. 354,071. (No model.)

*To all whom it may concern:*

Be it known that I, LUKE HOUZE, a citizen of the United States, residing at Fostoria, in the county of Seneca and State of Ohio, have invented certain new and useful Improvements in Floats for Glass-Furnaces; and I do declare the following to be a clear, full, and exact description of the invention, such as will enable others skilled in the art to which it appertains to make and use the same, reference being had to the accompanying drawings, and to the letters marked thereon, which form a part of this specification.

My present invention relates to improvements in floats for glass-melting furnaces; and it consists in certain novel features herein described and claimed.

In the annexed drawings, which fully illustrate my invention, Figure 1 is a sectional plan view of a furnace or tank having my improved device in operative position therein. Figs. 2, 3, and 4 are perspective views of the several parts of the floats or floating partitions.

The tank or furnace D may be of any desired size or form, and has a smoke-stack T, provided with an opening covered by door F, and with perpendicular curved recesses on the inner faces of its side walls $d\ d\ d\ d$, as shown.

The float or floating partition A C B is composed of an intermediate member C, having recessed side faces E and two outer members, the ends $c$ of the outer members A and B resting in the recesses $d$ in the side walls of the tank or furnace and in the recesses $e$ in the side faces of the intermediate member, the combined length of the three members being greater than the width of the tank. The three members when united thus form an arch, the top of which points toward the chimney, or the part of the tank into which the material to be melted is introduced, so that the molten mass in flowing toward the working-out openings will press against the arched part of the float and constantly press the members together, and thus take up the wear on the ends thereof. The ends resting snugly within the recesses in the side faces of the intermediate member and in the side walls are greatly protected from the heat and corrosive action of the chemicals used in making glass. The glass is removed from the tank through openings S S, and any number of additional floats may be used.

In floats wherein the ends are exposed the heat and chemicals used in making glass soon corrode the ends and cause them to drift from position and allow the impurities to flow to the working-out openings, thus ruining the product. My device automatically takes up the wear and causes the float to stay in position until the aggregate length of the three members becomes less than the width of the tank.

I am aware that floats have been made which are attached to the side walls, and I do not claim attaching them thereto; nor do I claim, broadly, floating partitions.

Having thus described my invention, what I claim, and desire to secure by Letters Patent of the United States, is—

In a glass-furnace, the combination of a tank having opposing recesses in the inner faces of its side walls, and a floating partition consisting of an intermediate member having recessed side faces and two outer members, the ends of the outer members resting in the recesses in the side walls and intermediate member, and the combined length of the three members being greater than the width of the tank, as and for the purposes set forth and described.

In testimony whereof I affix my signature in the presence of two witnesses.

LUKE HOUZE.

Witnesses:
A. J. STACKHOUSE,
JAMES O'NEILL.